US010606501B2

(12) United States Patent
B et al.

(10) Patent No.: US 10,606,501 B2
(45) Date of Patent: Mar. 31, 2020

(54) MANAGEMENT OF PAGING IN COMPRESSED STORAGE

(71) Applicant: International Business Machines Corporation, Armonk, NY (US)

(72) Inventors: Balaji B, Bangalore (IN); Chetan L. Gaonkar, Kumta (IN); Prajith P. Kumaran, Edappal Via (IN); Anasuya M. Shankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 14/959,458

(22) Filed: Dec. 4, 2015

(65) Prior Publication Data

US 2017/0160981 A1 Jun. 8, 2017

(51) Int. Cl.
*G06F 3/06* (2006.01)

(52) U.S. Cl.
CPC .......... *G06F 3/0644* (2013.01); *G06F 3/0608* (2013.01); *G06F 3/0647* (2013.01); *G06F 3/0683* (2013.01)

(58) Field of Classification Search
CPC .......... G06F 3/064; G06F 3/0608; G06F 7/08; G06F 7/22; G06F 7/24; G06F 12/1009; G06F 12/123; G06F 12/02; G06F 12/08; G06F 1/3275; G06F 2009/45583; G06F 12/0871; G06F 12/122; G06F 3/067; G06F 12/0246; G06F 3/0647; G06F 3/0688; G06F 2212/261; G06F 2212/1044; G06F 2212/401; G06F 9/50
See application file for complete search history.

(56) References Cited

U.S. PATENT DOCUMENTS

| | | | | |
|---|---|---|---|---|
| 5,960,169 | A * | 9/1999 | Styczinski | G06F 11/1076 711/114 |
| 6,321,293 | B1 | 11/2001 | Fabrizio et al. | |
| 6,349,375 | B1 | 2/2002 | Faulkner et al. | |
| 6,523,102 | B1 * | 2/2003 | Dye | G06F 12/023 709/247 |
| 6,598,143 | B1 * | 7/2003 | Baker | G06F 12/023 707/999.202 |
| 7,587,572 | B1 | 9/2009 | Stenstrom | |
| 2002/0147893 | A1 * | 10/2002 | Roy | G06F 12/08 711/154 |
| 2007/0088920 | A1 | 4/2007 | Garcia et al. | |
| 2007/0118710 | A1 * | 5/2007 | Yamakawa | G06F 3/061 711/165 |
| 2007/0294550 | A1 * | 12/2007 | May | G06F 12/023 713/320 |
| 2008/0301256 | A1 * | 12/2008 | McWilliams | G06F 12/0284 709/214 |
| 2013/0326182 | A1 * | 12/2013 | Bavishi | G06F 3/0647 711/165 |
| 2014/0189281 | A1 | 7/2014 | Sokol, Jr. | |

(Continued)

*Primary Examiner* — Daniel C. Chappell
(74) *Attorney, Agent, or Firm* — Peter J. Edwards

(57) ABSTRACT

A storage management unit is configured to identify a plurality of page frames in primary storage. The storage-management unit is further configured to determine an amount of unused capacity of each page frame of the plurality of page frames. The storage-management unit is further configured to sort the plurality of page frames based on the determined amount of unused capacity of each page frame.

16 Claims, 8 Drawing Sheets

(56) References Cited

U.S. PATENT DOCUMENTS

2016/0062691 A1* 3/2016 Chang ................ G11C 11/4072
  713/320
2017/0090776 A1* 3/2017 Kowles ................ G06F 3/0608

* cited by examiner

MANAGEMENT OF PAGING IN COMPRESSED STORAGE

BACKGROUND

The present disclosure relates to computer storage management, and more specifically, to managing the primary storage available to a computer through paging techniques.

Storage-management systems typically have the capability to organize data within primary storage into same-size blocks. These same-size blocks are referred to as pages. Pages may be selected, based on how recently the pages were used, for page compression. Compressed pages may be grouped together in page frames and relocated to secondary storage to create more unused capacity in primary storage.

SUMMARY

Some embodiments of the disclosure can be illustrated by a method, system, or computer program product. In the method, system, or computer program product, a storage-management unit may identify a plurality of page frames in primary storage. The storage-management unit may determine an amount of unused capacity of each page frame of the plurality of page frames. The storage-management unit may then sort each frame of the plurality of page frames according to the amount of unused capacity of that page frame.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
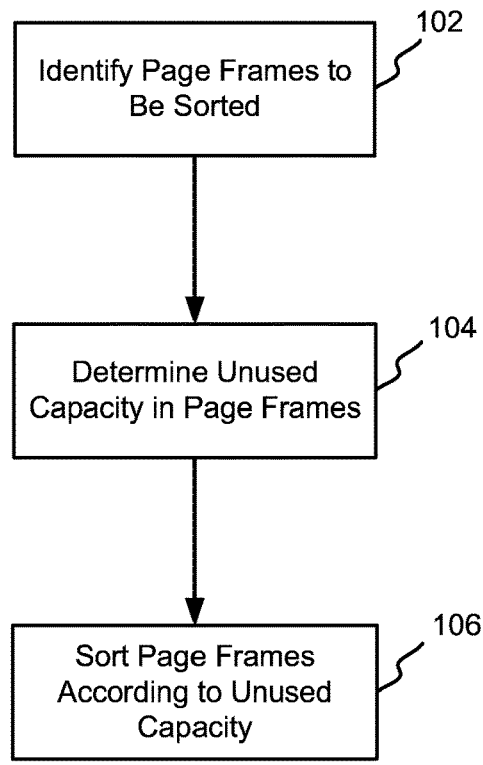
FIG. 1 depicts a logic-flow diagram illustrating a method of sorting page frames according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer storage management, more particular aspects relate to managing the primary storage available to a computer through virtual primary storage techniques. While the present disclosure is not necessarily limited to such applications, various aspects of the disclosure may be appreciated through a discussion of various examples using this context.

Typical computer storage-management systems use various techniques to maximize the amount of storage available to the computer processor and ensure the data most directly accessible by the processor is the data most frequently used by the processor. A computer may use various storage elements, which may include primary storage and secondary storage elements. Primary storage may be a volatile storage medium, such as registers, cache, and random-access memory (RAM), among others, and is directly accessible by the processor. Secondary storage may be non-volatile storage such as hard disks, magnetic tapes, solid-state drives, optical disks, and others, and is typically not directly accessible by the processor.

Typically, secondary storage is slower to read from and write to than primary storage, but is less expensive to produce and takes up less physical space than primary storage. Primary storage is useful to the processor due to its high speed. However, computers generally do not include sufficient primary storage for all of the computer's operations and long-term data-storage requirements. Thus, secondary storage is used to store information that the processor is either not currently using or does not use frequently. Because processors typically do not have direct access to information in secondary storage, information from secondary storage is transferred to primary storage by the operating system when it is needed by the processor. This transfer process may be slowed by the comparatively low speed at which information in the secondary storage may be read and the transfer speed of information between the secondary and primary storage. The process may be further delayed if there is insufficient unused capacity in the primary storage to accept the information. In this case the storage-management unit typically transfers data from primary storage to secondary storage to create sufficient unused capacity for the information needed by the processor.

An operating system, hypervisor, BIOS, etc. may perform storage-management decisions and operations by means of a storage-management unit. A storage-management unit is a computer hardware unit through which primary-storage references pass. It may take the form of an integrated circuit that is separate from a system's main processor, or may be implemented as part of the main processor. Storage-management units are typically responsible for managing storage decisions that affect primary storage, such as paging, primary-storage protection, organization of data within primary storage, transfers to and from primary storage, and others.

Computer storage-management units may use several methods to increase the effectiveness of the processor's use of the system's storage. For example, computer storage-management units may employ compression techniques to reduce the capacity required for a given amount of information. Compression techniques typically involve replacing repeated bits, patterns of bits, or unimportant strings of bits with a shorter sequence that contains the same information. An example of a compression schema may be illustrated by a picture file containing a long sequence of bits indicating the color "red" for each individual pixel between pixels 10,000 and 10,200. If the file were compressed, that long sequence may be replaced with a shorter sequence indicating "red" for the next 200 pixels. Compression ratios of 8:1 or 10:1, for example, may reduce the amount of capacity used by a data sequence by 8 times or 10 times respectively. However, that compressed information must be decompressed in primary storage before the processor can access it. If insufficient capacity exists in primary storage for decompression, the storage-management unit creates capacity by compressing other information or transferring information to secondary storage, both of which may be time consuming.

Thus, it is beneficial for compression techniques to avoid compressing information that is likely to be requested by the processor in the short term, or information that is requested often. For this reason typical compression techniques use methods to identify, as targets for compression, the information that is least likely to be requested before other information. These methods often use an algorithm, sometimes referred to as a least-recently-used algorithm, to identify the information that was requested by the processor least recently (e.g., data pertaining to the application that was least recently opened by a user). Some methods may also use an algorithm to identify information that has no CPU cycles for compression. The results of these algorithms are used when a high requirement for primary storage creates a need to compress information.

Storage-management solutions often take advantage of methods in addition to compression in an attempt to increase the effectiveness of the processor's use of the system's storage. Further storage-management solutions include techniques by which the storage-management unit simulates to the processor that a larger amount of primary storage is available. One such technique is referred to as "paging." In paging, information is stored in blocks that are referred to as pages. Pages are contained within page frames in primary storage. A page frame serves as the address of a page in primary storage; it may be thought of as a slot in primary storage into which all the data of a page is written. When pages are decompressed, page frames are typically the same size as a page. However, when pages are compressed, a page frame may have capacity for multiple pages (i.e., it may have multiple page slots), depending on the level of compression. If pages were compressed at a compression ratio of two to one, for example, page frames would have capacity for two pages (i.e., would have two page slots). Note that while actual page frames in storage may not contain discernable or demarcated physical "slots," page frames are presented as containing such slots in this disclosure for purposes of comprehensibility.

The size devoted to a page frame in storage is typically unaffected by either the compression ratio at which pages are compressed or even the amount of compressed pages written into the page frame. For example, the page frames in a storage may be 10,000 kilobytes (KB). If the pages in the system were compressed at a four-to-one ratio, each page would only consume 2,500 KB. However, if a page frame only contained one 2,500 KB page, 10,000 KB of the storage's capacity would still be devoted to that page frame. Pages and page frames may vary in size from system to system (i.e., one system may feature pages far larger than the pages of another system), but in typical paging all of the pages within a single system are the same size.

Paging manages storage by facilitating the transfer of data from primary storage to secondary storage. Because pages are typically a set size within a system, paging provides an accurate, fast method to track the address of pages that have been transferred to secondary storage ("paged out"); this is due in part to the fact that address of each non-compressed page will typically be larger or smaller than addresses of adjacent non-compressed pages by a size interval of one non-compressed page. For example, if the page size in a system were 1,000 bytes, the beginning address of the first, second, and third non-compressed pages in storage may be 0, 1,000, and 2,000 respectively. These addresses identify locations in secondary storage to which the information of each page has been paged out.

Storage-management systems typically page out the pages stored in the pool of compressed primary storage during periods of high requirement for primary storage. This is because storage-management systems typically mainly compress the pages that have been least recently used. These pages, in many cases, are less likely to be requested by the processor before non-compressed pages, and thus are less likely to lead to frequent page faults if paged out. However, the benefits of the page-size-interval address system are typically maximized only when blocks of data are paged out at the set size of one non-compressed page. Otherwise, the page address of a page compressed at a four-to-one ratio would take up less room than the address of a page compressed at a ten-to-one ratio, and the locations of page addresses in storage would be less predictable and would consume more resources to manage. Thus, in typical storage-management systems, paging in and paging out typically transfers data the size of a page frame (or a multiple of pages frames) at a single time, even if only transferring a single page compressed at a ten-to-one ratio. For this reason page addresses in secondary storage are typically unaffected by the compression ratio or number of compressed pages written within the address; paging out a single page that is compressed at a four-to-one ratio (e.g., from 10,000 KB to 2,500 KB) will consume the size of an entire non-compressed page. In this way, page addresses in secondary storage are similar to page frames.

In typical storage-management systems, if a page frame in primary storage contains four pages that have been compressed at a ten-to-one ratio (i.e., it is forty percent full) paging out any single page causes all four pages to be paged out together. By paging out the entire contents of a page frame together, the same-size-block benefits of paging may be maintained even when pages are being compressed to maximize storage space. Thus, the contents of a page frame, whether compressed or not, are typically transferred to secondary storage in same-size blocks that are the size of the page frame. Further they are transferred to addresses in secondary storage that function similarly to page frames. Therefore, for the purpose of comprehensibility, the act of paging out or paging in the compressed pages within a page frame will often be referred to herein as transferring the page frame itself. However, it should be understood that, in embodiments, the page frame is not being relocated to or from secondary storage; only the contents of the page frame are being relocated. Further, the embodiments discussed herein will typically use examples in which all pages in a page frame have been compressed using the same compression ratio (usually ten to one). This is also for the purposes of comprehensibility, but it should be understood that in some embodiments pages in the same page frame may be compressed to different ratios without affecting the analysis.

Some storage-management systems periodically detect pages in primary storage that have not been recently requested and "steal" them from primary storage. This "stealing" may not relocate the contents of the page frames, but adds them to a list of pages that are available to be relocated to secondary storage in the event of a high requirement for primary storage. This list is typically referred to as a free page queue. The free page queue resembles the results of the least-recently-used algorithm, as it typically only reflects the amount of time since data was requested by the processor.

Paging is typically transparent to the processor, such that the processor's records show that the page frame is still located in primary storage regardless of whether the contents of the page frame have been paged out. In this way the amount of primary storage available to the processor may be increased from the processor's perspective, allowing a greater amount of operations to be performed in a short amount of time. However, when the processor attempts to access information within a paged-out page frame, it actually only accesses the new address of the page frame. The page frame containing that information typically must then be relocated to primary storage ("paged in"). The operating system first stalls the related process and then pages in the information from the address location in secondary storage back to primary storage. This is referred to as a page fault, and is more time consuming than the processor being able to read the information immediately from the primary storage. This extra time delay may be due to a number of factors including, for example, the information needing to be read an extra iteration (by the storage-management unit in secondary storage), the secondary storage's slower read speeds, the transfer delay from secondary storage to primary storage, and the information needing to be written an extra iteration (into primary storage).

To avoid page faults, it may be beneficial for storage-management systems to store as few page frames that are likely to be requested by the processor in secondary storage as possible. In typical storage-management systems, compression techniques access and write to page frames frequently. This is because each page, upon being compressed, is placed into a page frame in primary storage. This page frame must have sufficient unused capacity for that compressed page. If a page frame with sufficient unused capacity is located within primary storage, the newly compressed page may be placed within that page frame. If no page frame in primary storage contains sufficient unused capacity, the storage-management system will attempt to locate a page in secondary storage with sufficient unused capacity. If such a page is found, it must be paged in to primary storage, leading to a page fault. Because compression techniques run frequently in typical storage-management systems, storing page frames with low unused capacity in primary storage and page frames with high unused capacity in secondary storage will likely lead to frequent page faults. However, typical storage-management systems may store many page frames with a high amount of unused capacity in secondary storage because the operating system, hypervisor, BIOS, etc. does not analyze page-frame contents before identifying page frames to be placed in the free-page queue or paged out. Further, storage-management systems may store pages corresponding to a single application in multiple page frames. When the processor requests that single application, each of those page frames typically must be paged in.

Further, storing a large number of pages with a high amount of unused capacity in secondary storage may result in contraction of the pool of compressed storage. Contraction of compressed storage occurs when the inefficient use of paging causes the effective size of compressed storage to be decreased. For example, if the compressed page frames in secondary storage were largely empty and the compressed page frames in primary storage were largely full, very little further data may be distributed to the page frames in primary storage. Further, the largely full page frames in primary storage may not be relocated to secondary storage, because all page-frame addresses in secondary storage are occupied by largely empty page frames. If the situation were reversed, however, and the compressed page frames in secondary storage were largely full and the compressed page frames in primary storage were largely empty, further pages could be compressed and redistributed to the compressed page frames in primary storage. This would enable more data to be compressed in total, creating more unused capacity in primary storage.

However, as previously noted, typical systems select compressed page frames for stealing and for page redistribution without analyzing the unused capacity of those page frames as compared to other page frames. This may create a need for a storage-management system with improved methods for preventing a high number of high-unused-capacity page frames in secondary storage and improved methods for consolidating pages corresponding to the same application onto the same page frames.

In some embodiments of the present disclosure, the amount of unused capacity of each page frame in a group of page frames is determined. This group of page frames may consist of page frames in primary storage, secondary storage, or both. The group may consist of some or all of the page frames in either storage type. The page frames may then be sorted according to the amount of unused capacity in the page frames. In some embodiments this sorting may take the form of ranking page frames according to the unused capacity of each page frame. Sorting may, in addition to or alternatively, take the form of identifying page frames with above or below a threshold amount of unused capacity.

Several actions may be performed after sorting in order to lessen the likelihood of future page faults. For example, the storage-management unit may assign a number of page frames to be relocated from primary storage to secondary storage in the event of a high primary-storage requirement. In some embodiments the storage-management unit may redistribute pages among page frames in order to create sufficient unused capacity in a page frame for all pages corresponding to a program. Pages may also be distributed to centralize pages in a small amount of page frames with low unused capacity rather than being distributed throughout a large amount of page frames with high unused capacity. In further embodiments the storage-management unit may identify page frames with sufficient unused capacity to accept newly paged data.

FIG. 1 depicts a logic-flow diagram illustrating a method 100 of sorting page frames. In block 102 the storage-management unit may identify page frames that are to be sorted. In some embodiments page frames in primary and secondary storage may be sorted. In other embodiments, page frames in either primary or secondary storage, but not both, may be sorted. It may be beneficial to sort only primary-storage page frames, for example, in response to a high demand for primary storage; sorting the page frames in primary storage may help identify the page frames that would be suitable for relocation to secondary storage. Reciprocally, it may be beneficial to sort only secondary-storage page frames, for example, if a large amount of primary storage becomes available; sorting the page frames in secondary storage may help identify the page frames that would be suitable for relocation to primary storage, preventing future page faults for those page frames. In some embodiments it may be beneficial to sort only a subset of the page frames either in secondary storage, primary storage, or both. For example, if a single page frame with at least two empty page slots is needed immediately, it may be faster to select 100 random page frames for sorting rather than to select all page frames, assuming that any group of 100 random page frames is likely to contain a page frame with at least two extra page slots.

In some embodiments, it may be beneficial to identify only page frames located in the compressed pool of storage to be sorted. Because pages in the compressed storage pool have typically been calculated to be less recently used than pages in the non-compressed pool of storage, they are typically less likely to be requested by the processor once paged out. Thus, paging out page frames from the compressed pool typically will lead to fewer page faults than paging out page frames from the non-compressed pool. Further, while page frames in both the compressed and non-compressed pool of storage may contain unused capacity, the data in non-compressed page frames are typically not available to be edited. For this reason a page frame with four KB of capacity and only one byte of used capacity (i.e., 4,095 KB unused capacity) in the non-compressed pool of storage cannot be written to, and thus the unused capacity cannot be utilized. In other words, no more data—paged, compressed, or otherwise—may be relocated to that page frame. Thus, sorting page frames from the compressed pool of storage may be more likely to identify a greater number of pages that are suitable for paging out or page-relocation decisions.

After the page frames to be sorted are identified in block 102, the unused capacity in each identified page frame may be determined in block 104. This unused capacity may be measured in available page slots, available data (e.g., bits, bytes, or megabytes), a percentage of total capacity that is unused, or others. After the unused capacity of the page frames is determined, the page frames may be sorted according to that unused capacity in block 106. This sorting may take different forms in different embodiments. Sorting may involve ranking sorted page frames based on the amount of unused capacity (e.g., assigning the page frames a "rank" or "order" from the highest amount to the lowest amount). Sorting may also take the form of selecting page frames with an unused capacity above or below an unused capacity threshold. For example, sorting may identify all page frames or a subset of all page frames (1) with above or below a number of unused or used page slots (e.g., all page frames with at least four unused page slots), (2) that are above or below a set percentage of the page-frame capacity that is used or unused (e.g., thirty page frames that are at least eighty percent empty), (3) that are within a percentile of unused capacity among the group of page frames (e.g., the ten percent of page frames with the most unused capacity), (4) that contain more or less than a specified capacity (e.g., all page frames that contain less than 500 megabytes (MBs) of unused capacity), or (5) others. Sorting may further identify a set number of page frames or all page frames that contain a set number or any of several set numbers of unused page slots (e.g., five page frames that contain three unused page slots or ten page frames that contain seven unused page slots).

In some embodiments, sorting may include storing the results of block 106 (e.g., a sorted list of page frames within a threshold or a list of ranked page frames and storing the list in a database, table, or similar) in primary or secondary storage for use in decisions related to relocating page frames and redistributing pages within the page frames. In some embodiments, sorting may include relocating the contents of page frames in primary or secondary storage to reflect the unused capacity of the page frames (e.g., sorting all page frames may include relocating the contents of page frames in primary storage such that the page frames are located, in primary storage, in order of the amount of their unused capacity). In further embodiments, sorting may include immediately making a decision related to relocating page frames and redistributing pages within page frames, followed by immediately deleting the results of block 106 (e.g., sorting 100 random page frames in primary storage, relocating the 10 page frames with the lowest unused capacity to secondary storage, and deleting the results of block 106 upon completing the relocation).

Figure 2A:
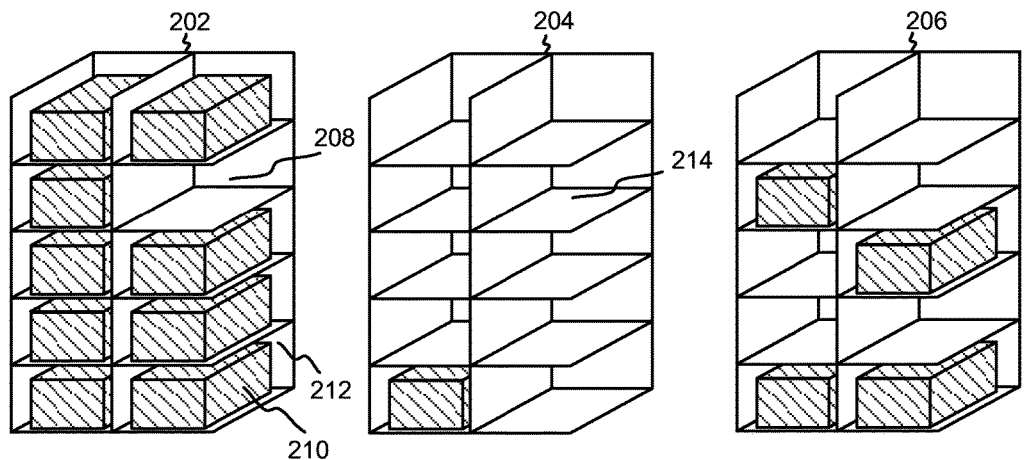
FIGS. 2A-2B depict a graphical example of page frames being sorted, according to embodiments of the present disclosure.
Figure 2B:
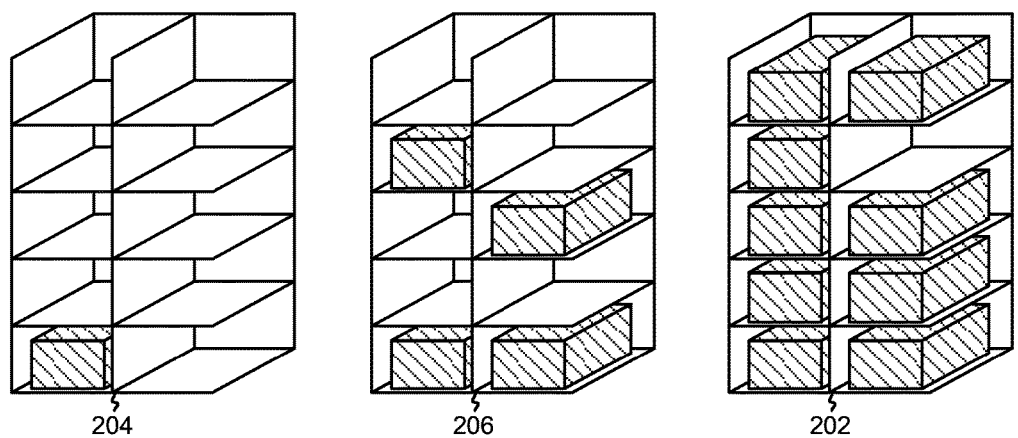

FIG. 2A and FIG. 2B depict a graphical example of page frames being sorted. Page Frames 202-206 each represent page frames that contain ten Page Slots 208. Page Slots 208 may contain Pages 210, or may be unused. Page Slot 212, for example, contains a Page 210, whereas Page Slot 214 is unused.

FIG. 2A illustrates Page Frames 202-206 in an unsorted form. Page Frame 202 contains one unused Page Slot 208, Page Frame 204 contains nine unused Page Slots 208, and Page Frame 206 contains six unused Page Slots 208. If all three Page Frames 202-206 are identified as to be sorted, they may be ranked according to the amount of unused capacity of each. Accordingly, FIG. 2B shows Page Frames 202-206 rearranged in order of descending amounts of unused capacity. After having sorted the frames, the storage-management unit may maintain a record of the rank of each page frame for use in decisions related to relocating page frames and redistributing pages within the page frames. Further, Page Frames 202-206 are shown as being relocated upon sorting in this embodiment. In some embodiments, this may be reflected by a relocation of the contents of the page frames in storage, but in other embodiments it may signify the information relating to the sorting results being stored, potentially for later decisions related to relocating page frames and redistributing pages within the page frames.

Figure 3:
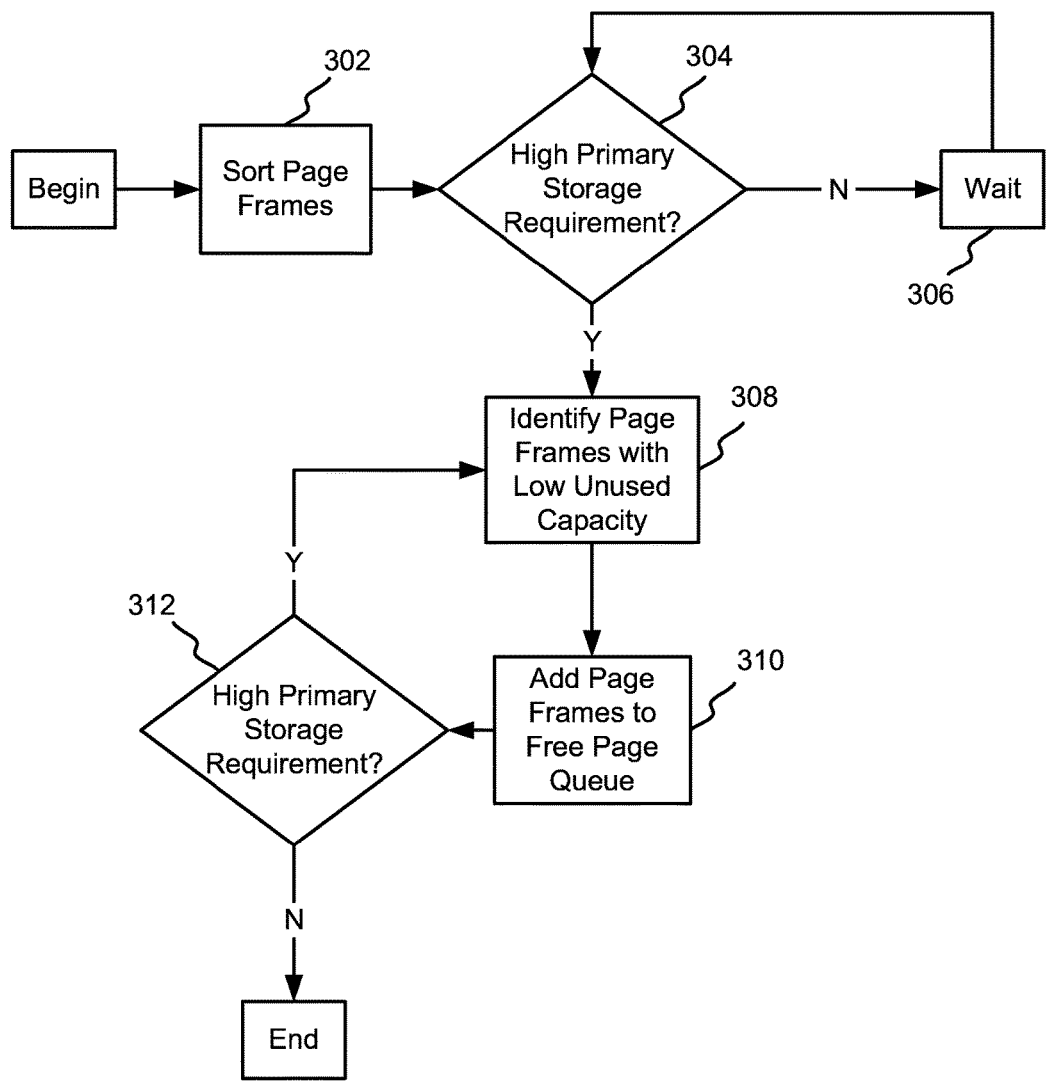
FIG. 3 depicts a logic-flow diagram illustrating a method of identifying page frames for reassignment to secondary storage, according to embodiments of the present disclosure.

FIG. 3 depicts a method 300 of identifying page frames for reassignment to secondary storage. Reassigning page frames to secondary storage may occur in conjunction with a high requirement for primary storage. The method may begin at block 302, in which the page frames are sorted, for example, using any method discussed herein or equivalent thereof. After the page frames are sorted, block 304 determines whether the system is experiencing a high requirement for primary storage. If the system is not experiencing such a requirement, the method proceeds to block 306, at which point the storage-management unit waits a pre-determined amount of time before looping back to block 304. This pre-determined amount of time may be very short, such that block 304 would occur at every processor tick, in order to increase the likelihood that a high-primary-storage requirement may be identified soon after developing. In other embodiments, however, the amount of time may be longer, based on other objectives.

If the storage-management unit determines in block 304 that the system is experiencing a high requirement for primary storage, it proceeds to select page frames in primary storage with low unused capacity in block 308. In embodiments in which all page frames were ranked according to the amount of unused capacity in block 302, the storage-management unit may select the page frame with the lowest amount of unused capacity, or the N page frames with the lowest amounts of unused capacity. In other embodiments the selection may differ based on the sorting method applied in block 302. For example, if the page frames were sorted by identifying the page frames in the bottom ten percent of unused capacity (i.e., the page frames with the least unused capacity), the storage-management unit may select in block 308 any page frame identified in block 302. If it is anticipated that a particularly high primary storage requirement is imminent, sorting in block 302 may identify all page frames with, for example, at least nine out of ten page slots filled. In some embodiments the sorting in block 302 may select low-unused-capacity page frames using such a high threshold that block 308 is not necessary because every page frame identified in block 302 would exhibit sufficiently low unused capacity.

In block 310, the storage-management unit adds the selected page frames to the free-page queue. By adding the page frames to the free-page queue, the storage-management unit is flagging the page frames as free to be relocated. Block 310 represents one method by which page frames selected in block 308 may be relocated to secondary storage. In other embodiments, such as in storage-management systems without a free-page queue, page frames may be identified in a different manner, distinct from a free-page queue. In even further embodiments, the system may, in addition to or in lieu of identifying the page frames as available for relocation, relocate the page frames in block 310.

In block 312 the storage-management unit determines whether there is still a high primary storage requirement. In some embodiments this determination may be equivalent to the determination of block 304, but in other embodiments it may differ according to the particular operation of block 310. For example, if block 310 relocated selected page frames to secondary storage rather than adding them to the free-page queue, the determination in block 312 may be identical to that in block 304. However, if block 310 added the selected page frames to the free-page queue without relocating them, block 312 may instead determine whether a high-primary-storage requirement would still exist if all page frames in the free-page queue were relocated to secondary storage. In other embodiments, page frames may be identified for relocation in block 310, but this may be done in the absence of a free-page queue. In such embodiments, block 312 may determine whether a high-primary-storage requirement would still exist if all the page frames identified in block 310 were relocated to the primary storage.

If the storage-management unit determines in block 312 that a high requirement for primary storage still exists or would exist, it loops back to block 308 to select further page frames with low unused capacity. In some embodiments, however, a previous iteration of block 308 may have selected all frames that were previously identified in block 302, in which case all the page frames identified in block 302 may have been relocated to secondary storage. In these instances, it may be beneficial to redirect the storage-management unit back to block 302, rather than block 308. If, on the other hand, the storage-management unit determines in block 312 that there is no longer a high requirement for primary storage, the method terminates.

Figure 4:
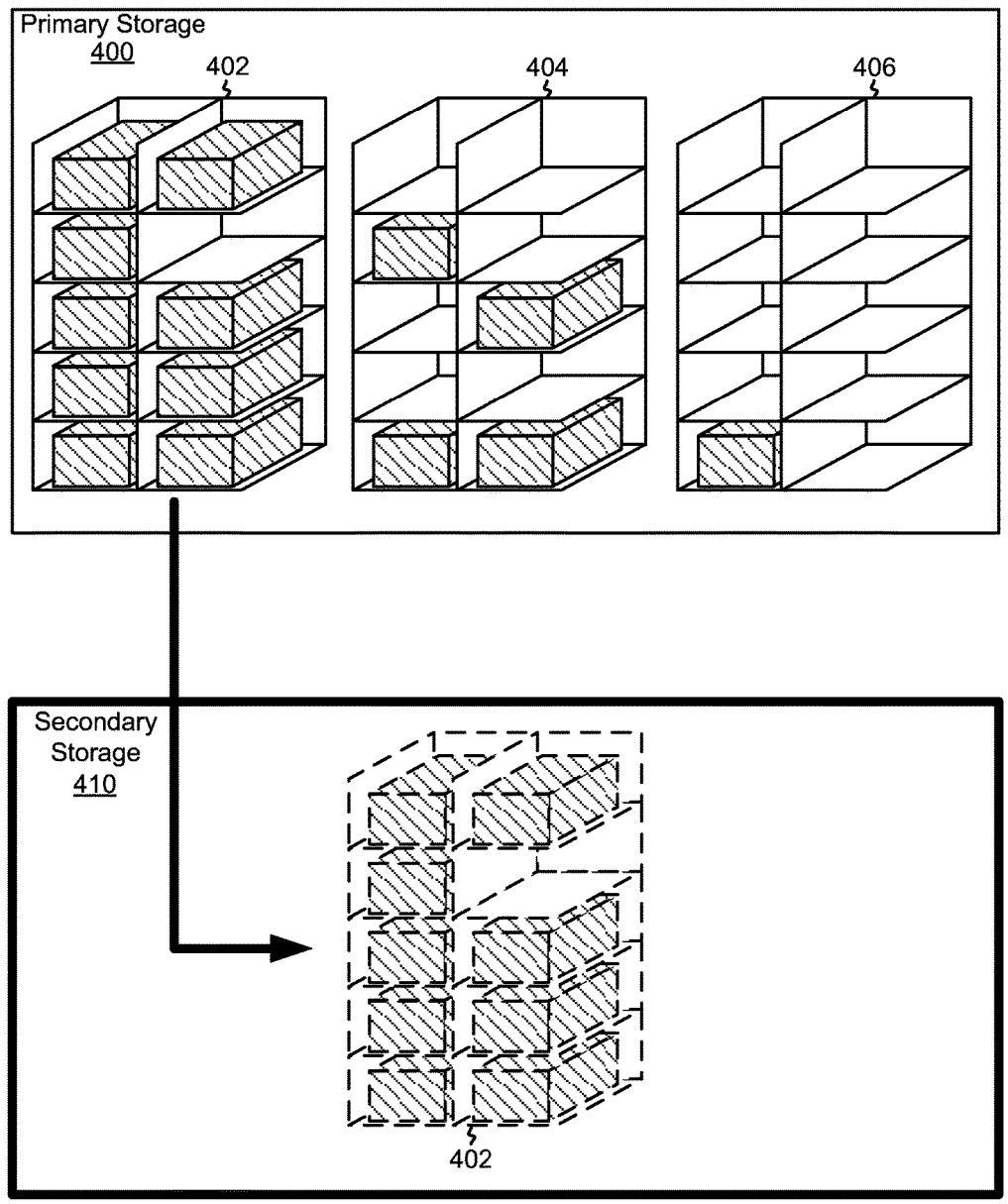
FIG. 4 depicts a graphical example of a page frame being relocated to secondary storage, according to embodiments of the present disclosure.

FIG. 4 depicts a graphical example of a page frame being relocated to secondary storage, for example, if the page frame is identified for relocation in a method discussed herein or an equivalent thereof. In FIG. 4 Page Frames 402-406 are located in Primary Storage 400. The page frames are ordered in ascending order of amount of unused capacity, as if sorted by a method discussed herein or an equivalent thereof. If the storage-management unit recognized a requirement for an additional page-frame's worth of capacity in Primary Storage 400, it may relocate Page Frame 402 to Secondary Storage 410, as shown. Page Frame 402 would be relocated rather than Page Frame 404 or Page Frame 406 because Page Frames 404 and 406 have a higher amount of unused capacity; relocating page frames with high amounts of unused capacity to secondary storage may lead to a high amount of page frames in secondary storage, each with a small amount of information, potentially leading to a high number of page faults.

Figure 5:
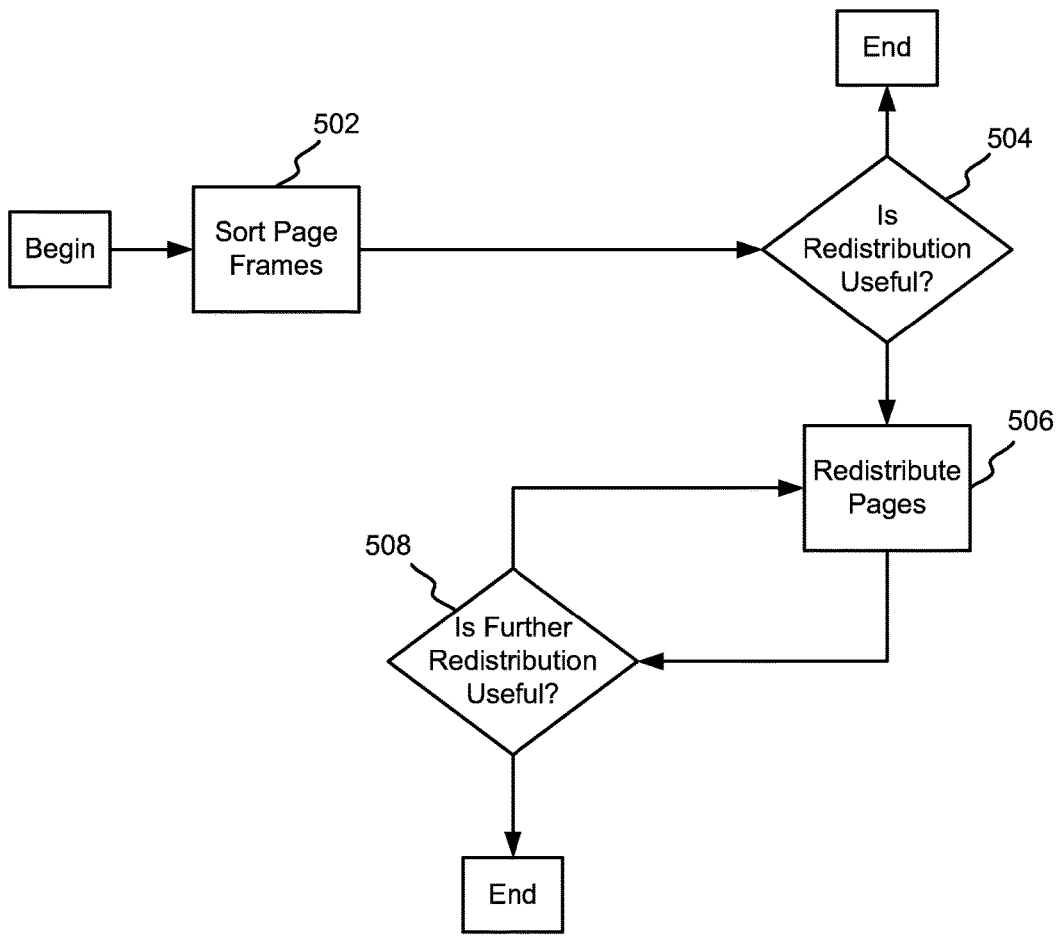
FIG. 5 depicts a logic-flow diagram illustrating a method of redistributing pages within page frames, according to embodiments of the present disclosure.

FIG. 5 depicts a method 500 of another example in which sorting results similar to that of FIG. 1 may be used in storage management: identifying pages to be redistributed within page frames. Such redistribution may typically occur, for example, when preparing to relocate a page frame to secondary storage, or as part of an effort to enable a group of pages from the same operation or application to be located within the same page frame. The method begins at block 502, in which the page frames are sorted using a method similar to those discussed in relation to FIG. 1. The storage-management unit then determines in block 504 whether redistribution of the pages within the page frames would be useful. Redistribution may be useful, for example, if many page frames in primary storage were only twenty percent full or less. The pages from those page frames could be combined in to fewer page frames, which, if full, could then be relocated to secondary storage. The same may be true if primary storage contains many pages that are sixty percent full and forty percent full, or any other partial values that would add up to a full page frame if combined. Resulting empty page frames could then be used, for example, to hold new pages that are created from the non-paged pool of storage, or to redistribute pages from a single operation or application into the same page frame.

If redistribution is not useful, the method terminates. If redistribution is useful, pages within the page frames are redistributed in block 506. In typical embodiments this will involve moving pages from page frames that have a high amount of unused capacity to page frames that have a low amount of unused capacity. However, pages may be moved to and from page frames of any amount of unused capacity as long as the receiving page frames have sufficient unused capacity to receive the moved pages. After pages are redistributed, the storage-management unit determines in block 508 if further redistribution would be useful. Further redistribution may be useful, for example, if the first redistribution made available sufficient unused capacity in a single page frame or a small number of page frames for the information relating to a single operation or application. Consolidating the pages holding this information into fewer page frames would lead to fewer page frames being paged in during a page fault if those page frames are relocated to secondary storage.

If further redistribution would be useful, the storage-management unit proceeds to further redistribute the pages in block 506. After further redistribution the storage-management unit may proceed to block 508. If, on the other hand the storage-management unit determines that further redistribution would not be useful, the method terminates.

Figure 6A:
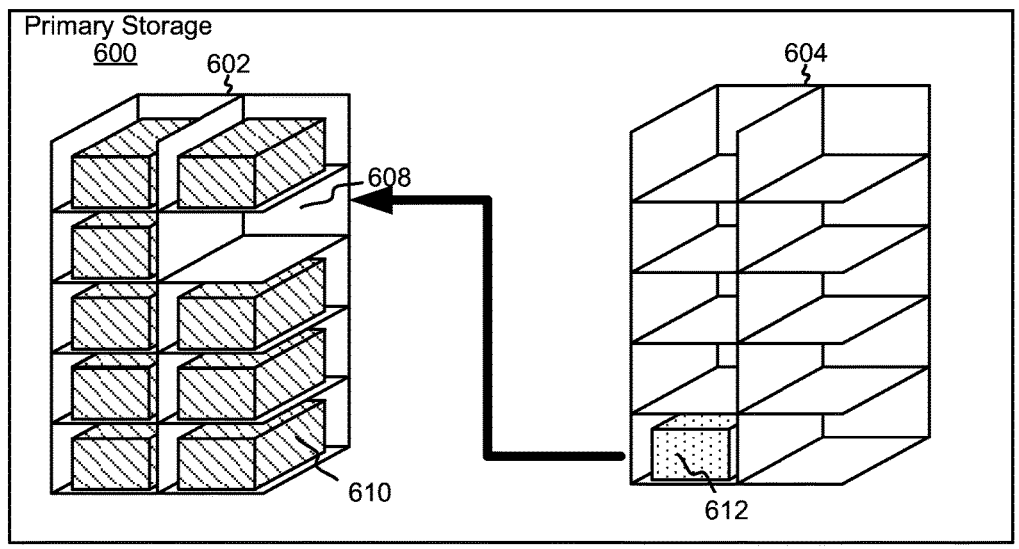
FIG. 6A-6B depicts a graphical example of redistribution of pages within page frames, according to embodiments of the present disclosure.
Figure 6B:
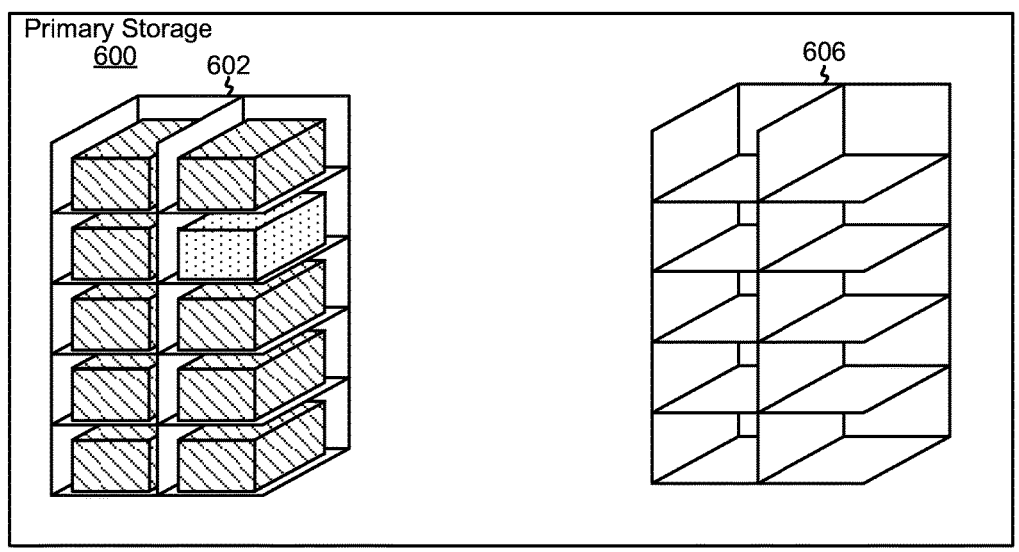

FIGS. 6A and 6B provide a graphical example of pages being redistributed in page frames. Page Frames 602 and 604 each represent a page frame with ten Page Slots 608. Both Page Frames 602 and 604 are located in Primary Storage 600. Page Frame 602 contains nine Pages 610 and thus has only ten percent unused capacity, sufficient only for one more page. A page frame may have a low page slot capacity, such as one page slot unused, for example, when one page in a page frame is paged back in, decompressed, and relocated to the decompressed pool of primary storage. Because all pages of a page frame are paged out and paged in together, the nine pages that were not requested would be paged in to primary storage, but would remain compressed.

Page Frame 604, on the other hand, contains a single Page 612. In some embodiments it may be beneficial to relocate Page 612 to Page Frame 602, as shown in FIG. 6B. Once Page 612 is relocated to Page Frame 602, the data from Pages 610 and Page 612 may be paged out to secondary storage in a single page frame. Further, if the data in Page 612 were requested by the processor and paged back in, the data from Pages 610 would again be paged in with Page Frame 602 as well. If, on the other hand, no page redistribution occurred two page faults would occur (specifically, one for Page Frame 604 when Page 612 is requested and one for Page Frame 602 when Pages 610 are requested).

Further, if Page 612 were requested, in the above example, at a later time when there is excess unused capacity in Primary Storage 600, the storage-management unit may keep Page Frame 602 in Primary Storage 600 after Page 612 is decompressed and relocated. This may eliminate the potential for a further page fault if the data from Pages 610 were to be subsequently requested by the processor.

Figure 7A:
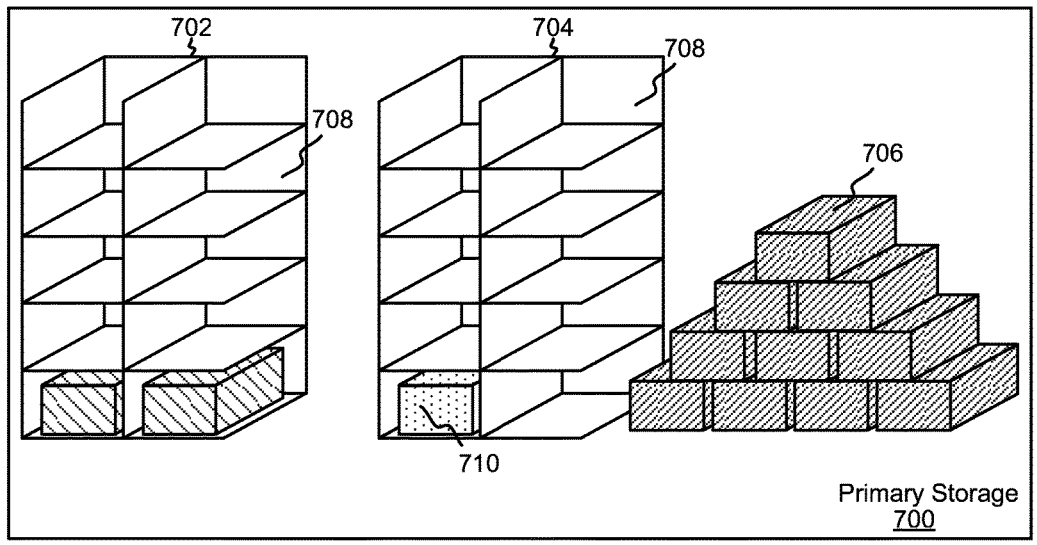
FIG. 7A-7B further depicts a second graphical example of redistribution of pages within page frames, according to embodiments of the present disclosure.
Figure 7B:
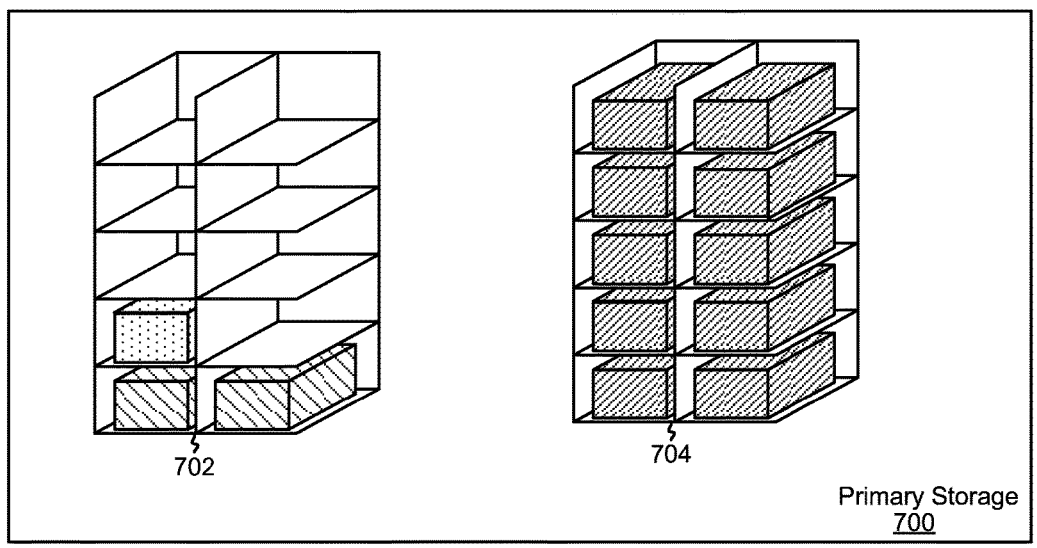

FIGS. 7A and 7B provide a further graphical example of pages being distributed in page frames. Similar to the example in FIG. 6A, Page Frames 702 and 704 each represent a page frame with ten Page Slots 708, and both Page Frames 702 and 704 are located in Primary Storage 700. FIG. 7A differs from FIG. 6A in that both Page Frames 602 and 604 have a high amount of unused capacity. Thus, relocating Page 710 to Page Frame 702 results in a page frame with only three filled Page Slots 708 instead of two. This redistribution would cause Page Frame 702 to become only slightly more suitable for relocation to secondary storage. However, redistribution of the pages between Page Frames 702 and 704 may have other benefits. As shown in FIG. 7A, Primary Storage 700 also contains ten Pages 706. Pages 706 are not shown here as in any particular page frame. In some embodiments Pages 706 may be scattered throughout multiple page frames. In other embodiments Pages 706 may have just been organized into pages but not yet distributed to page frames.

In this embodiment, all ten Pages 706 are presented with a unique shading to signify that all ten Pages 706 contain information corresponding to the same application or operation. As has been discussed, the processor may typically request all the information corresponding to the same application simultaneously when the application is activated. Thus, if all ten Pages 706 were paged out in a secondary storage, all ten Pages 706 would be paged back in when the application to which they correspond was activated. Further, if Pages 706 were scattered throughout multiple page frames, all those page frames would need to be paged in in their entirety. If those page frames contained pages with data corresponding to other applications (i.e., data not requested by the processor), extensive unnecessary delays may result due to the reading, transferring, and writing of that data.

Thus, there is a benefit to all Pages 706 being located within the same page frame. If the storage-management unit sorted Page Frames 702 and 704 by the amount of their unused capacity, the storage-management unit would be able to determine that neither of Page Frames 702 or 704 have sufficient unused capacity to accept all ten Pages 706. However, it would also be able to determine that Page Frame 702 does have sufficient unused capacity to accept Page 710, and that such a redistribution would create sufficient unused capacity in Page Frame 704 for all Pages 706.

Such a redistribution is reflected in FIG. 7B. In FIG. 7B, Page Frame 704 contains all Pages 706. Further, Page Frame 704 has no unused capacity, making it particularly suitable to be added to a free-page queue or immediately transferred to secondary storage.

In some embodiments, the storage-management unit may consider factors in addition to the amount of unused capacity in decisions related to selecting page frames to be relocated from primary to secondary storage. In some embodiments the amount of time since the processor requested data in a page frame may have less weight than, more weight than, or equal weight to the amount of unused capacity. For example, if data in a page frame with less unused capacity than a second page frame had been requested far more recently than the data in a second page frame with more unused capacity, the page frame with more unused capacity may be selected to be relocated to secondary storage. Further, the conditions under which or related to when data in a page frame is typically requested may have less weight than, more weight than, or equal weight to the amount of unused capacity. For example, if data is requested very regularly, but only on system startup, the fact that it had been requested more recently than or may be located in a page frame with more unused capacity may be outweighed by the fact that the data is not likely to be used again prior to any other page.

In some embodiments the degree to which compression techniques are used may be considered when determining the weight to give the amount of unused capacity of a page frame. In a storage-management system that uses compression infrequently, for example, page faults due to requests for pages with sufficient unused capacity to accept newly compressed pages may not be frequent enough to lead to high performance degradation of the system. In such a system, using other factors, such as those previously discussed, in paging-out decisions may have a higher probability to reduce page faults than unused capacity of the page. In some embodiments paging out page frames with low unused capacity may lead to a higher number of page faults because such page frames may have compressed pages relating to many different applications, each of which may create a need for the data in the page while that page frame is paged out. In other embodiments, however, compression techniques may be used very frequently, and the amount of unused capacity in a page may be the largest factor leading to page faults. In those embodiments, it may be beneficial for the amount of unused capacity in a page frame to be given the most weight in page-out decisions. In some embodiments, the degree to which compression techniques are used may be an instantaneous determination (e.g., whether a storage-management unit is currently using compression techniques), a forward-looking determination (e.g., whether a storage-management unit is expected to use compression techniques in the future), an average determination (e.g., the average degree to which a storage-management unit uses compression techniques), or others.

Figure 8:
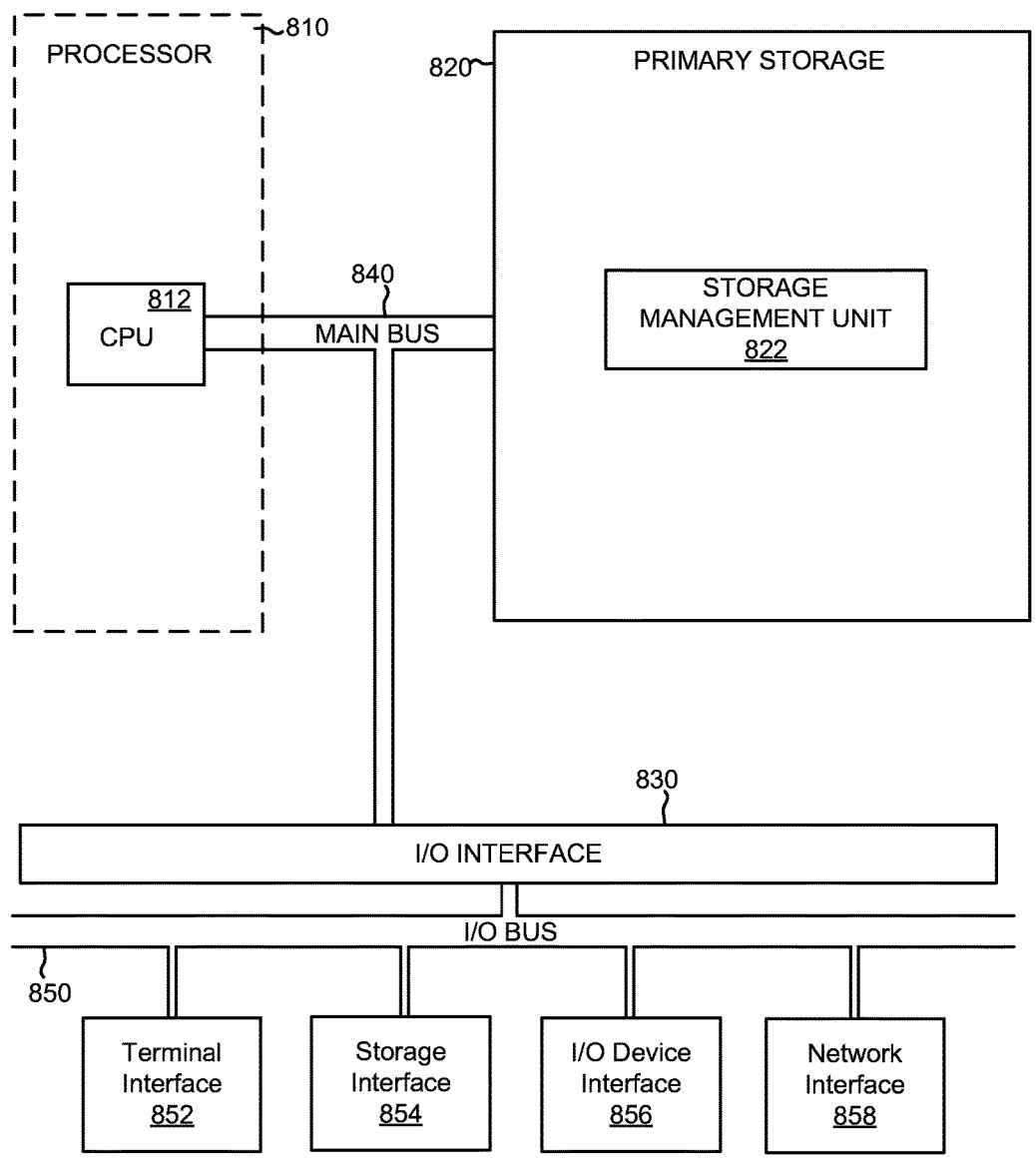
FIG. 8 depicts an embodiment of a representative computer system, according to embodiments of the present disclosure.

FIG. 8 depicts the representative components of a Computer System 801 that may be used in accordance with embodiments of the present disclosure. The particular components depicted are presented for the purpose of example only and are not necessarily the only such variations. The Computer System 801 may comprise a Processor 810, Primary Storage 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may be comprised of one or more CPUs 812. The Processor 810 may additionally be comprised of one or more memory buffers or caches (not depicted) that provide temporary storage of instructions and data for the CPU 812. The CPU 812 may perform instructions on input provided from the caches or from the Primary Storage 820 and output the result to caches or the Primary Storage 820. The CPU 812 may be configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Primary Storage 820 of the Computer System 801 may be comprised of a Storage-Management Unit 822 and one or more memory modules for temporarily or permanently storing data (not depicted). In some embodiments, the Primary Storage 820 may comprise a random-access semiconductor memory, storage device, or storage medium (either volatile or non-volatile) for storing data and programs. The Storage-Management Unit 822 may communicate with the Processor 810, facilitating storage and retrieval of information in the memory modules. While the Storage-Management Unit 822 is here depicted as located as part of the Primary Storage 820, in some embodiments is may alternatively be located elsewhere, such as internal to the Processor 810 or external to both the Primary Storage 820 and the Processor 810. The Storage-Management Unit 822 may communicate with the I/O Interface 830, facilitating storage and retrieval of input or output in the memory modules. In some embodiments, the memory modules may be dual in-line memory modules.

The I/O Interface 830 may comprise an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Primary Storage 820 to the various interfaces of the I/O Bus 850. The I/O Interface 830 may also direct instructions and data from the various interfaces of the I/O Bus 850 to the Processor 810 and Primary Storage 820. The various interfaces may comprise the Terminal Interface 852, the Storage Interface 854, the I/O Device Interface 856, and the Network Interface 858. In some embodiments, the various interfaces may comprise a subset of the aforementioned interfaces (e.g., an embedded computer system in an industrial application may not include the Terminal Interface 852 and the Storage Interface 854).

Logic modules throughout the Computer System 801—including but not limited to the Primary Storage 820, the Processor 810, and the I/O Interface 830—may communicate failures and changes to one or more components to a hypervisor or operating system (not depicted). The hypervisor or the operating system may allocate the various resources available in the Computer System 801 and track the location of data in Primary Storage 820 and of processes assigned to various CPUs 812. In embodiments that combine or rearrange elements, aspects of the logic modules' capabilities may be combined or redistributed. These variations would be apparent to one skilled in the art.

The present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C66 or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   identifying, by a storage-management unit, a plurality of page frames in a primary storage, wherein the plurality of page frames is located in a pool of compressed primary storage;
   determining, by the storage-management unit, an amount of unused capacity of each page frame of the plurality of page frames;
   sorting, by the storage-management unit, the plurality of page frames according to the amount of unused capacity of the each page frame of the plurality of page frames, wherein the sorting comprises establishing an unused capacity threshold;
   identifying at least one page frame of the plurality of page frames with an unused capacity that is lower than the unused capacity threshold;
   selecting, based on the identifying, the at least one page frame as available for paging out from the primary storage to a secondary storage during a high primary storage requirement;
   concluding that a high primary storage requirement exists; and
   relocating, based on the selecting and the concluding, the at least one page frame from the primary storage to the secondary storage.

2. The method of claim 1, wherein sorting each page frame of the plurality of page frames also comprises ranking the page frames in order of the amount of unused capacity of each page frame.

3. The method of claim 1, wherein the sorting also comprises identifying a predetermined number of page frames with the lowest unused capacity of the plurality of page frames and wherein the at least one page frame is included in the predetermined number of page frames.

4. The method of claim 3, wherein the predetermined number of page frames is selected based on a requirement for primary storage.

5. The method of claim 1, wherein the relocating the at least one page frame is also based on an amount of time since data in the at least one page frame was requested by a processor.

6. The method of claim 1, wherein the relocating the at least one page frame is also based on historical patterns of conditions related to when data in the at least one page frame has been requested by a processor.

7. The method of claim 1, wherein the relocating the at least one page frame is based on the degree to which compression techniques are used.

8. A system comprising one or more storage-management units configured to perform a method comprising:
   identifying a plurality of page frames in a primary storage, wherein the plurality of page frames is located in a pool of compressed primary storage;
   determining an amount of unused capacity of each page frame of the plurality of page frames;
   sorting the plurality of page frames according to the amount of unused capacity of the each page frame of the plurality of page frames, wherein the sorting comprises identifying a predetermined number of page frames with the lowest unused capacity of the plurality of page frames;
   selecting, based on the identifying, at least one page frame in the predetermined number of page frames as available for paging out from the primary storage to a secondary storage during a high primary storage requirement;
   concluding that a high primary storage requirement exists; and
   relocating, based on the selecting and the concluding, the at least one page frame ef from the primary storage to the secondary storage.

9. The system of claim 8, wherein the sorting each page frame of the plurality of page frames also comprises ranking the page frames in order of the amount of unused capacity of each page frame.

10. The system of claim 8, wherein the method further comprises:

identifying a first page frame in the plurality of page frames with a lower unused capacity than a second page frame in the plurality of page frames; and relocating a page to the first page frame based on the lower unused capacity.

11. The system of claim 10, wherein the page is relocated from the second page frame.

12. The system of claim 10, wherein the page is relocated from a pool of primary storage that was previously non paged.

13. A computer program product, the computer program product comprising a computer readable storage medium having program instructions embodied therewith, the program instructions executable by a computer to cause the computer to:

identify, by a storage-management unit, a plurality of page frames in a primary storage, wherein the plurality of page frames is located in a pool of compressed primary storage;

determine, by the storage-management unit, an amount of unused capacity of each page frame of the plurality of page frames;

sort, by the storage-management unit, the plurality of page frames according to the amount of unused capacity of the each page frame of the plurality of page frames, wherein the sorting comprises ranking the page frames in order of the amount of unused capacity of each page frame;

select, by the storage management unit and based on the ranking, at least one page frame as available for paging out from the primary storage to a secondary storage during a high primary storage requirement;

conclude, by the storage management unit, that a high primary storage environment exists; and relocate, by the storage management unit and based on the selecting and the concluding, the at least one page frame from the primary storage to a secondary storage.

14. The computer program product of claim 13, wherein the program instructions also cause the computer to:

identify a first page frame in the plurality of page frames with a lower unused capacity than a second page frame in the plurality of page frames; and relocate a page to the first page frame based on the lower unused capacity.

15. The computer program product of claim 14, wherein the page is relocated from the second page frame.

16. The computer program product of claim 14, wherein the relocating a page is performed to enable a group of pages from a same application to be located within a same page frame.

* * * * *